UNITED STATES PATENT OFFICE.

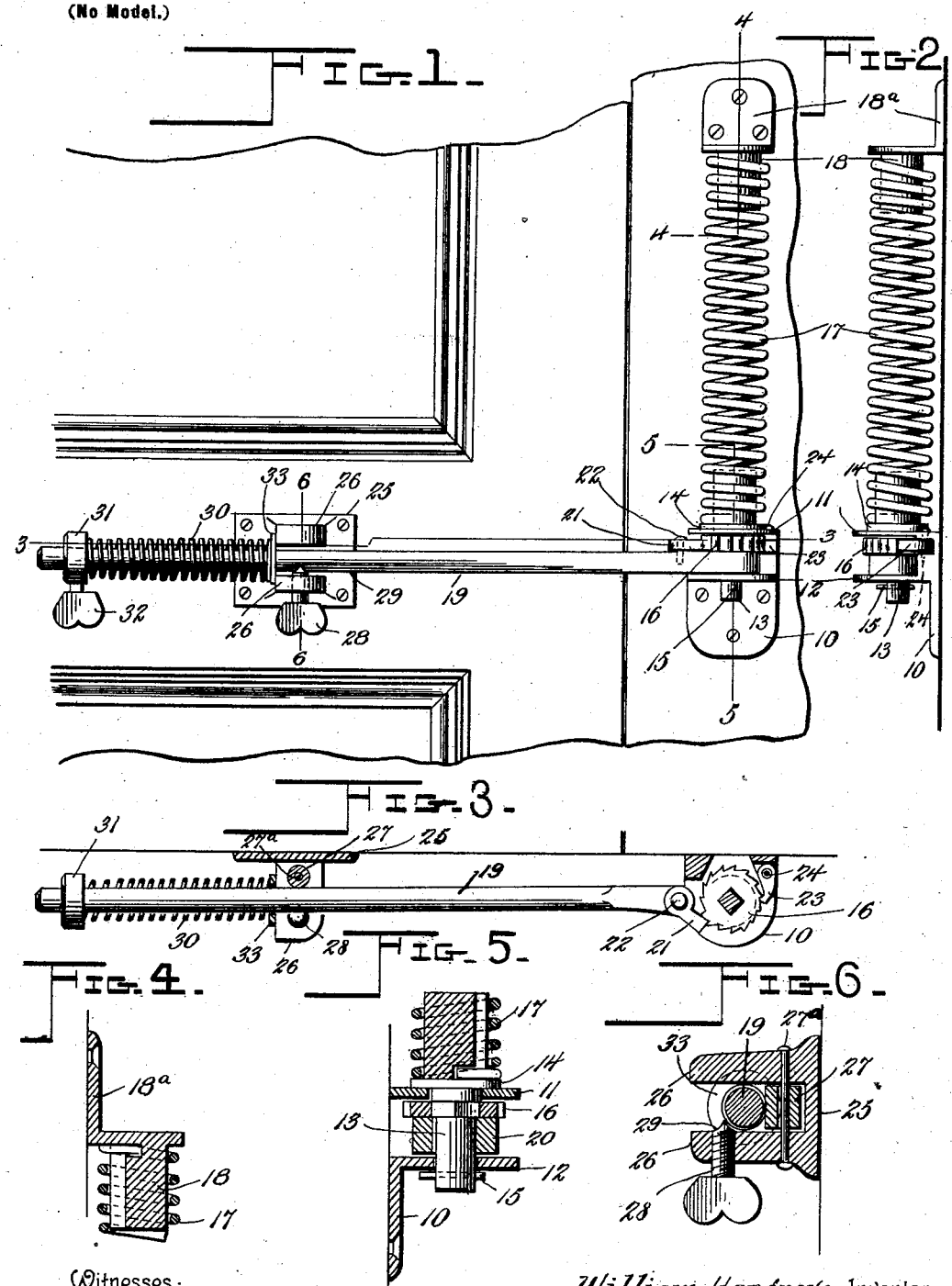

WILLIAM HARGROVE, OF MONTREAL, CANADA, ASSIGNOR OF ONE-FOURTH TO BREADALBANE CAMPBELL MACLEAN, OF MONTREAL, CANADA.

DOOR-SPRING.

SPECIFICATION forming part of Letters Patent No. 693,389, dated February 18, 1902.

Application filed February 1, 1901. Serial No. 45,569. (No model.)

*To all whom it may concern:*

Be it known that I, WILLIAM HARGROVE, a subject of the Queen of Great Britain, residing in the city and district of Montreal, Province of Quebec, Canada, have invented certain new and useful Improvements in Door-Springs; and I do hereby declare that the following is a full, clear, and exact description of the invention, such as will enable others skilled in the art to which it appertains to make and use the same.

My invention relates to improvements in door-springs; and the objects in view are, first, to provide means for easily placing the closure-spring under tension, to relax or regulate the tension as found desirable, and to check the closing movement of the door so as to obviate violent slamming thereof.

With these ends in view the invention consists in the novel construction and arrangement of parts, which will be hereinafter fully described and claimed.

In the drawings hereto annexed, forming a part of this specification, Figure 1 is an elevation of the improved spring applied to a door. Fig. 2 is another elevation at right angles to Fig. 1. Fig. 3 is a sectional plan on the line 3 3 of Fig. 1. Fig. 4 is a vertical section on the line 4 4 of Fig. 1. Fig. 5 is another vertical section on the line 5 5 of Fig. 1, and Fig. 6 is a transverse detail section on the line 6 6 of Fig. 1.

The same numerals of reference denote like parts in all the figures of the drawings.

10 is the main bracket-plate, which is fastened to the door-jamb by any suitable means, and it is provided with the parallel bearing-ears 11 12, the same having vertically-alined openings which receive the spring-arbor 13. Said arbor is provided with a collar 14, adapted to rest upon the bearing-ear 11, and it is held in place against accidental disengagement from the two bearing-ears 11 12 by a key or cotter 15, whereby the arbor is mounted for axial rotation in the main bracket, and it is retained in place therein by the collar and key disposed on opposite sides of the bracket-ears. Said arbor has a ratchet 16 made fast therewith and arranged between the bracket-ears, and the upper part of the arbor is extended a suitable distance above the bracket-ear 11 in order that the coiled closure-spring 17 may be fitted around said upper part of the arbor and be seated upon the collar 14 thereof, said lower end of the closure-spring being made fast in any suitable way with the arbor. The upper end of the closure-spring 17 is fitted around a stud 18 on the upper bracket 18ª, the latter adapted to be secured to the door-jamb at a suitable height above the main bracket-plate 10, said upper end of the spring 17 being secured in a suitable way to the stud 18, substantially as shown by Fig. 4.

19 designates the door-arm, which is provided at one end with an eye 20, that is loosely fitted on the arbor 13, immediately below the ratchet 16 thereof, said arbor thus forming a means for pivotally connecting the door-arm to the bracket-plate 10. This arm carries a pawl 21, which is pivoted thereto by the pin 22, said pawl engaging with the ratchet 16, as shown by Fig. 3. An emergency-pawl 23 is pivoted to the bracket-plate 10 by the pin 24, and this emergency-pawl is arranged on the opposite side of the ratchet from the pawl 21, whereby the pawl 23 prevents the ratchet from rotating during the operation of placing the spring 17 under the desired tension.

A bracket 25 is adapted to be secured to the door, as shown by Figs. 1, 3, and 6, said bracket being furnished with the parallel ears 26, between which is slidably fitted the door-arm 19. This arm is arranged to ride against a friction-roll 27, which is arranged between the ears 26 and is loosely mounted on a pin 27ª, as shown by Fig. 6. In one of the ears of this door-bracket is journaled a screw 28, having a conical or tapered end 29, the latter extending alongside of the door-arm, so as to prevent the latter from moving out of position between the ears 26 when the screw is adjusted to the position shown by Fig. 6. The screw 28 may, however, be tightened against the arm 19, so as to clamp the latter firmly to the door-bracket, whereby the device is adapted to serve as a door-stop, because the rod 19 is firmly held on the door by the door-bracket and the screw, and it is connected in like manner to the door-jamb by the arbor and the main bracket 10. On this door-arm 19 is loosely fitted a check-spring 30, the latter being held against disengagement from the arm by the collar 31, having the clamping-screw 32, which is adapted to bind against the arm 19. A washer 33 is fitted loosely on the arm to occupy a position between the door-bracket and one end of the check-spring, as shown by Figs. 1 and 3, whereby one end of the check or cushion spring is seated against the fixed collar and its other end is seated against a washer which bears against the door-bracket.

From the foregoing description, taken in connection with the drawings, it will be understood that the improved spring may be easily applied in operative position by securing the several brackets to the jamb and to the door, respectively. The arm 19 may be disengaged from the door-bracket, which places it in a condition free from the door and enables it to be turned by hand around the axis afforded by the arbor. The rod may be moved back and forth for the purpose of placing the closure-spring under tension through the medium of the pawl and ratchet 21 and 16, respectively, because the outward movement of the arm makes the pawl turn the ratchet and the arbor having the lower end of the spring fastened thereto, while the backward movement of the arm allows the pawl 21 to slip idly over the ratchet, the emergency-pawl 23 preventing the ratchet from turning backward and relaxing the tension of the spring. The described adaptation allows the arm to be used as a lever for placing the spring under tension, and these devices may be employed to let down the tension of the spring without injury to the parts by reversing the mode of operation heretofore described. It is obvious that in the summer season of the year the door-spring is not required, and at this time the tension may be taken off the spring 17 by releasing the emergency-pawl 23. Ordinarily the rod or arm 19 is arranged to slide freely through the door-bracket when the door is opened or when it is closed by the recoil of the spring 17, and in this connection it will be noted that the spring 30 serves as the cushion to prevent violent slamming of the door when the latter is blown to by a strong gust of wind.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. A door-spring of the class described comprising a jamb-bracket adapted to be secured in a stationary position on a door-jamb, a spring-actuated arbor journaled in said jamb-bracket, a single ratchet secured fast to said arbor and disposed adjacent to said jamb-bracket, a single continuous door-rod loosely fitted on the arbor, a pawl 23 pivoted to the jamb-bracket and arranged to engage with said ratchet and occupying a stationary relation at all times to the door-rod, another pawl 21 pivoted to and movable with said door-rod and engaging normally with said ratchet, and means adapted to loosely and detachably connect said door-rod to a door, whereby the pawl 23 may be engaged with the ratchet and the door-rod and its pawl 21 may be manipulated by hand to place under tension the spring of said arbor, as set forth.

2. A door-spring of the class described comprising a jamb-bracket provided with offstanding plates, a spring-actuated arbor having a cylindrical portion journaled in said plates and an angular portion arranged in a plane between said plates, a single ratchet disposed between the plates and fitted to the angular part of the arbor to be fast therewith, a single door-rod fitted loosely on the cylindrical part of the arbor and adapted, under certain conditions, to turn loosely thereon, a pawl 23 pivoted to one of the bracket-plates and adapted to engage with the ratchet, another pawl 21 pivoted to the door-rod to move therewith and engaging normally with the ratchet, and means adapted to loosely connect said door-rod to a door, substantially as described.

3. A door-spring of the class described comprising a jamb-bracket, a spring-actuated arbor mounted therein, a door-bracket provided with offstanding plates arranged to form an intermediate space which opens through the outer end of the bracket and one of said plates having a threaded opening, a friction-roller journaled in said door-bracket at the closed inner side of the space therein, a single straight door-rod connected with the arbor to be actuated thereby and fitted loosely in the door-bracket to occupy the intermediate space and to lie between the friction-roller and the plane of the threaded opening in said door-bracket, and an adjusting-screw 28 arranged at right angles to the length of the door-rod and having a pointed end 29 disposed in coöperative relation to the door-rod, whereby the adjusting-screw may be retracted and the door-rod may be withdrawn by lateral adjustment from the door-bracket or said screw may be adjusted to confine the door-rod in the bracket or said screw may tightly impinge the door-rod to make the latter fast with the bracket, substantially as described.

4. A door-spring of the class described comprising a jamb-bracket, a spring-actuated arbor mounted therein, a door-bracket having a rod-receiving space which opens through the outer end thereof, a single straight door-rod connected operatively to said arbor and extending through said space of the door-bracket and withdrawable therefrom by a lateral adjustment, means for slidably confining the door-rod in the door-bracket, a washer fitted on a projecting portion of the door-rod and bearing against the door-bracket, a cushion-spring also fitted on said portion of the rod and seated against the washer, a collar independent of the door-bracket and adjustably fitted on the said portion of the rod and engaging with the outer end portion of the spring, and a clamping-screw mounted on the collar and impinging the rod, substantially as described.

In witness whereof I have hereunto set my hand in the presence of two witnesses.

WILLIAM HARGROVE.

Witnesses:
J. A. MARION,
B. C. MACLEAN.